No. 851,595. PATENTED APR. 23, 1907.
W. H. HOWELL.
EGG CASE.
APPLICATION FILED DEC. 11, 1905.
2 SHEETS—SHEET 1.
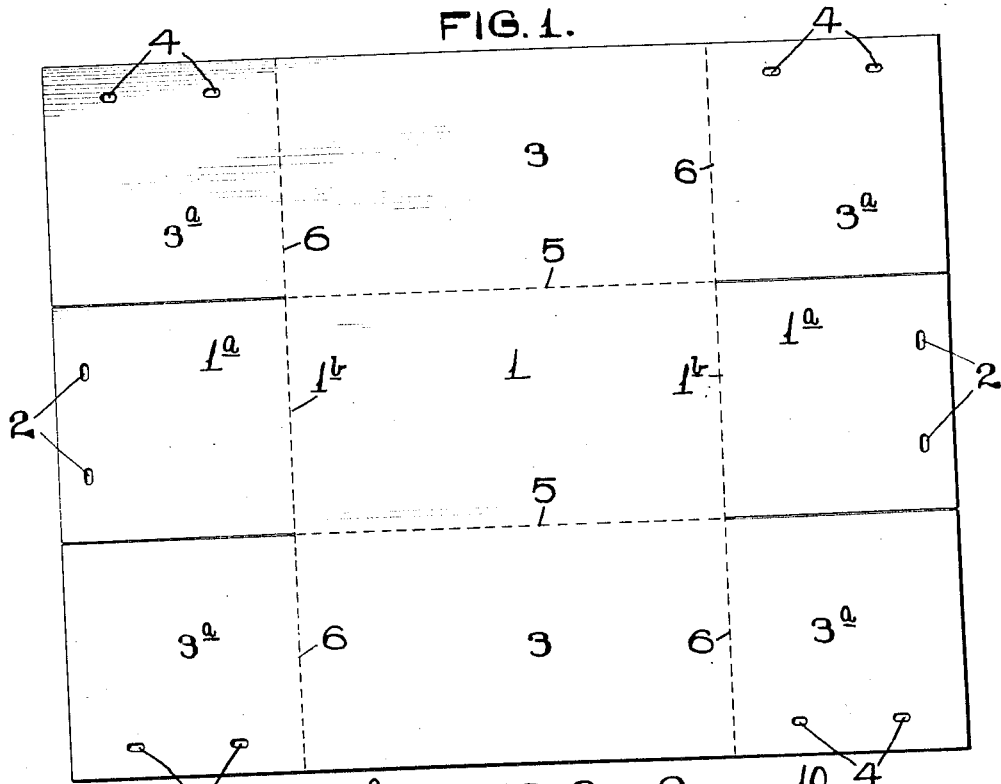
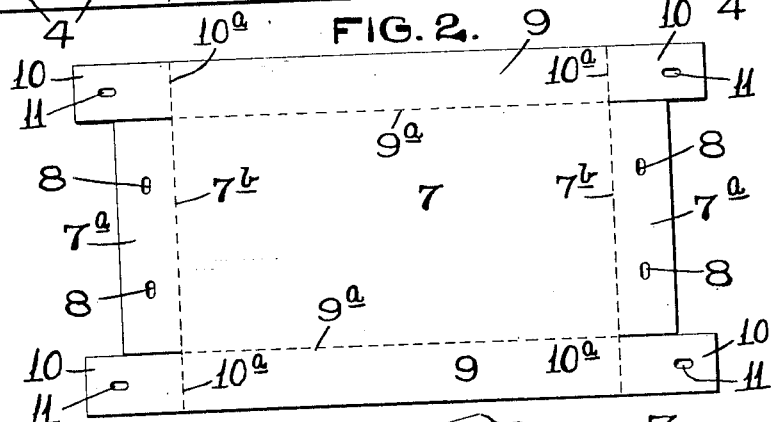
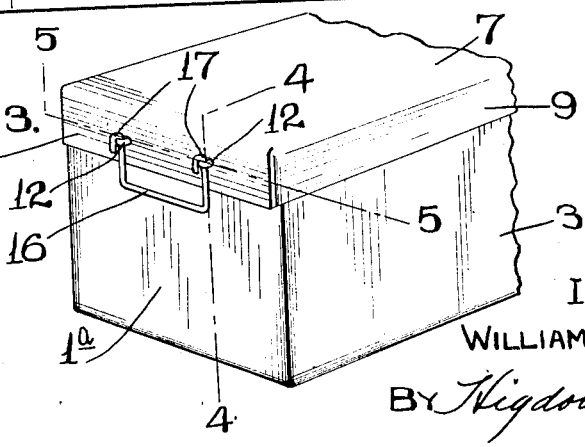
ATTEST.
H. O. Fletcher.
W. F. Smith.
INVENTOR.
WILLIAM H. HOWELL.
BY Higdon & Longan
ATT'YS.

No. 851,595.  
PATENTED APR. 23, 1907.  
W. H. HOWELL.  
EGG CASE.  
APPLICATION FILED DEC. 11, 1905.
2 SHEETS—SHEET 2.
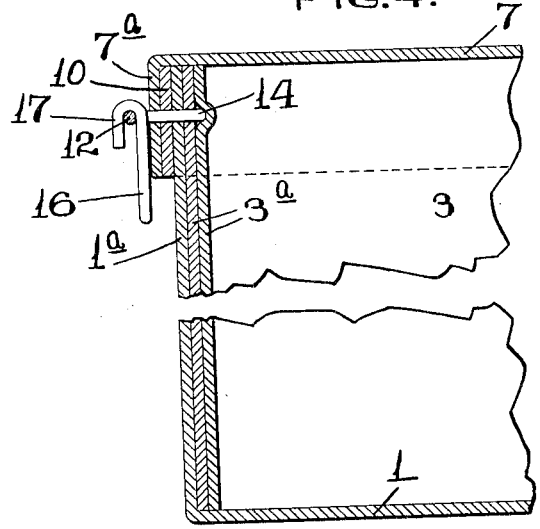
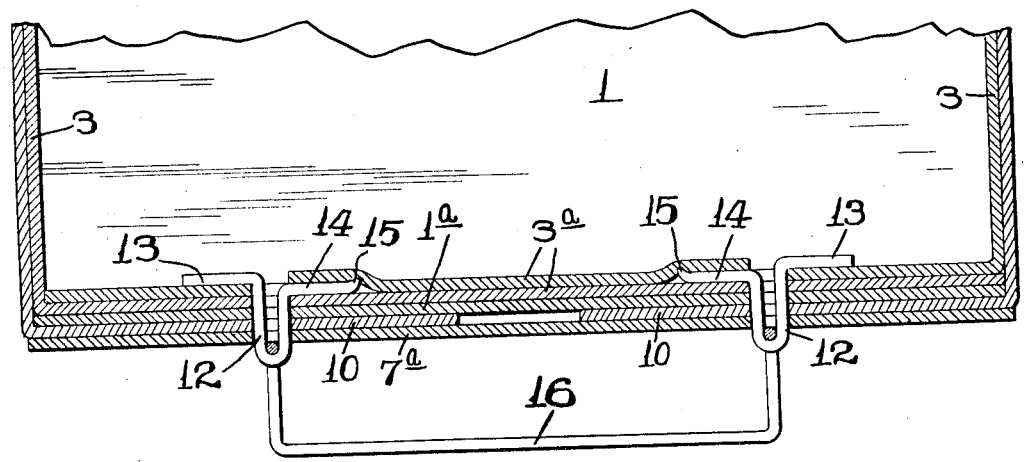
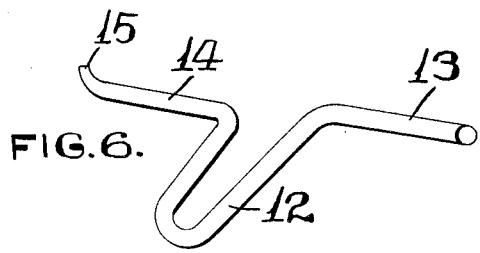
ATTEST.  
INVENTOR.  
WILLIAM H. HOWELL.  
ATT'YS.

UNITED STATES PATENT OFFICE.

WILLIAM H. HOWELL, OF HARRISBURG, ILLINOIS.

EGG-CASE.

No. 851,595.  Specification of Letters Patent.  Patented April 23, 1907.

Application filed December 11, 1905. Serial No. 291,282.

*To all whom it may concern:*

Be it known that I, WILLIAM H. HOWELL, a citizen of the United States, and a resident of Harrisburg, Saline county, Illinois, have invented certain new and useful Improvements in Egg-Cases, of which the following is a specification containing a full, clear, and exact description, reference being had to the accompanying drawings, forming a part hereof.

My invention relates generally to egg cases, and more particularly to the means of fastening the end walls of the cases together and the securing of the tops of the egg cases to the bodies thereof, and the fastening of the handles to the cases.

Heretofore in setting up egg cases of the class to which my invention relates, the devices by means of which the handles are secured to the egg cases have been very unstable and easily detached from proper position when folding the ends of the case over onto one another, and it is the object of my invention to so form and arrange fastening devices that when once in position will not become unseated as the ends of the cases are folded over onto one another and the ends of the tops are folded onto the ends of the cases.

A further object of my invention is to provide simple and inexpensive fastening devices for the ends of egg cases which will also retain the tops of the egg cases in position, and will also serve as means for securing the handles to the cases.

To the above purposes, my invention consists of certain novel features of construction and arrangement of parts that will be hereinafter more fully specified, pointed out in my claims, and illustrated in the accompanying drawings, in which:—

Figure 1 is a view of the blank from which the body of my improved egg case is formed; Fig. 2 is a view of the blank from which the top or cover of the case is formed; Fig. 3 is a perspective view of one end of an egg case of my improved construction with the cover and handle in position thereon; Fig. 4 is an enlarged vertical section taken on the line 4—4 of Fig. 3; Fig. 5 is a horizontal section taken on the line 5—5 of Fig. 3; Fig. 6 is a perspective of one of the fastening devices I make use of in carrying out my invention.

In the construction of my improved egg case, the body is constructed of a single sheet of material, preferably heavy straw board, such as is ordinarily used for packing bottles and like objects that are easily broken, said body being constructed of a single sheet of material cut into rectangular form and properly slitted so that it may be folded into the form of an open top box.

The sheet of material, such as is seen in Fig. 1, comprises the central rectangular section 1 which forms the bottom of the box, and with which is formed integral the end sections $1^a$, which end sections fold upon the dotted lines $1^b$. Formed adjacent the outer edge of each section $1^a$, and at equal distances apart are the apertures 2. The sections 3, equal in size to the section 1 and integral therewith, form the sides of the egg case, and integral with the ends of these side sections 3 are the end sections $3^a$. Formed adjacent the side edges of each end section $3^a$ is a pair of apertures 4 that are so spaced as to correspond with the apertures 2 when the end sections $3^a$ are folded. The side sections 3 fold relative the bottom section 1 on the dotted lines 5, and the end sections $3^a$ fold relative the side sections 3 on the dotted lines 6.

The top or cover for the egg case is constructed of a single sheet of material, and comprises the rectangular central section 7, and integral with the ends thereof are the end sections $7^a$ which fold downwardly on the dotted lines $7^b$ and in which are formed the apertures 8 that are so spaced as to correspond with the pairs of apertures 2 and 4 previously described.

Integral with the sides of the sections 7 are the side flaps 9, which are integral with and fold relative the sections 7 on the dotted lines $9^a$. Integral with the ends of the side flaps 9 are end flaps 10 which fold relative the flaps 9 on the dotted lines $10^a$, and formed in the outer end of each flap 10 is an aperture 11 that is so situated as that when the cover is folded into proper shape they will coincide with corresponding apertures 8.

The wire loops that are utilized for fastening the folded ends of the case together and for securing the ends of the cover to the case and to which the handles are secured are constructed of single pieces of wire, the central portions 12 of which are bent into U-shape to form elongated loops, and the ends thereof are bent outwardly away from one another and at right angles to the sides of the loop.

One of the sides of the U-shaped loop is shorter than the other so that when the ends are bent outwardly they do not occupy the same rectangular plane, one end 13 being slightly in front of the opposite end 14. The outer portion of the end 14 is bent forwardly a slight distance, as indicated by 15 to form a sharp projecting spur that will readily embed itself in the material of which the case is formed. Handles 16 of wire have their ends formed into hooks 17, so spaced as to engage the ends of the loops 12 when said loops are seated in the coinciding apertures in the ends of the case and cover.

The manner of setting up my improved case is as follows: The section 1 of the body of the case remains in a horizontal position while the sides 3 are bent into vertical planes along the dotted lines 5. The ends 3ª of one of the sides 3 are now bent on the corresponding dotted lines 6 around so that they occupy positions at the ends of the section 1 and at right angles to the side sections 3 to which they are fixed. One of the fastening loops is now passed through each aperture 4 in the end sections 3ª that have been bent around, which loops extend outwardly through the apertures, with each end 13 lying against the inner faces of the ends 3ª, and with the opposite ends 14 lying against the outer faces of said ends 3ª. The ends 3ª of the opposite side 3 are now bent around onto the outer faces of the first pair of ends 3ª, and in so doing the U-shaped loops are passed through the apertures 4 in the second pair of ends 3ª. During this folding of the second pair of ends 3ª, the U-shaped loops 12 will remain in position upon the first pair of ends 3ª for the reason that the ends of each loop are arranged on opposite sides of said first pair of ends 3ª, and for this reason they cannot become readily disengaged. The ends 1ª are now bent upwardly into vertical planes against the last pair of folded ends 3ª, and the outer ends of the loops 12 pass through the apertures 2 in said ends 1ª. The body of the case is now ready to be packed, after which the cover is placed in position on the case. The central portion, or section 7, of the cover is placed in position on top of the case, after which the end flaps 10 are folded around onto the ends of the case, and the U-shaped loops 12 pass through the apertures 11 in said end flaps. The ends 7ª of the cover are now bent downwardly over the inwardly folded ends 10, with the outer ends of the U-shaped loops 12 passing through the apertures 8. The hooks 17 on the ends of the handles 16 are now engaged in the outer portions of the U-shaped loops 12 that extend beyond the folded ends of the cover, and thus the ends of the cover are held folded, and the cover itself is secured to the body of the case.

Heretofore in setting up an egg case and its cover there has been much difficulty experienced in maintaining the folded ends in position as the successive parts are folded over onto one another, and by my improved arrangement of U-shaped loops and the manner of securing them to the ends of the first folded ends of the case, I am enabled to very quickly set up a case and secure the cover thereto.

The U-shaped loops are easily and cheaply manufactured, and can be very quickly placed in position on the first folded end, and, when so positioned, will not easily become detached.

I claim:

In an egg case, the combination with a folding body and folding cover, the ends of which body and cover are provided with coinciding apertures, of fasteners arranged through each corresponding set of apertures, the central portions of the bodies of which fasteners are bent into U-shaped loops having straight parallel sides, the ends of said fasteners being extended outwardly in opposite directions from the ends of the sides of said loops, one of the sides of the U-shaped body portions being shorter than the other to bring the outwardly bent ends out of longitudinal alinement, and one of said outwardly bent ends having its outer ends curved inwardly to form a spur; substantially as specified.

In testimony whereof, I have signed my name to this specification, in presence of two subscribing witnesses.

WM. H. HOWELL.

Witnesses:
 O. M. KARRAKER,
 C. MILLS.